H. Gardiner,
Churn.
No. 100,025. Patented Feb. 22, 1870.

United States Patent Office.

HEMAN GARDINER, OF NEW YORK, N. Y.

Letters Patent No. 100,025, dated February 22, 1870; antedated February 5, 1870.

IMPROVEMENT IN CHURNS.

The Schedule referred to in these Letters Patent and making part of the same.

*To all whom it may concern:*

Be it known that I, HEMAN GARDINER, of the city, county, and State of New York, have invented certain new and useful Improvements in Churns; and I do hereby declare that the following is a full description of the same.

The nature of my invention consists—

First, in giving the dasher a simultaneously-rotating and lifting motion by means of a toothed revolving cam and pinion-wheel lifting-plate on the dasher rod, for the purpose of more thoroughly agitating the milk than would be possible by the simple dashing operation alone.

Second, in making the pinion-wheel lifting-plate adjustable by means of set-screws or pins on the dash-rod, so as to limit the stroke of the dasher to the quantity of milk in the churn.

Third, in making the dasher-rod adjustable in length by means of set-screws or pins, so as to limit the stroke of the dasher in the operation of gathering the butter on the surface of the milk in the churn.

Fourth, in combining with a double dasher spirally-set paddles, so that as the dasher is rotated by the revolving cam, acting on the pinion-wheel on the dash-rod, it will give a whirling or rotatory motion to the milk, and gather the buttery particles to the center of the churn at the same time that it dashes it up around and through the holes in the dashers.

Fifth, in combining with the churn and revolving cam an air-pump for forcing a current of air into the bottom of the churn, to commingle with the milk to oxidize it, and thus facilitate the operation of separating the butter from the milk.

But, to describe my invention more particularly, I will refer to the accompanying drawings forming a part of this specification, the same letters of reference wherever they occur referring to like parts.

Figure 1:
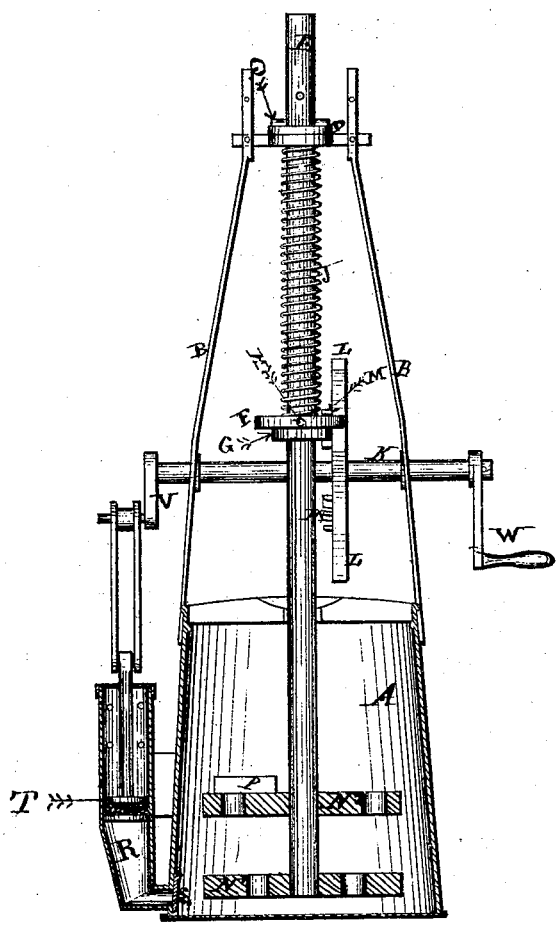
Figure 1 is a vertical cut-section of the churn and parts for operating the dashers.
Figure 2:
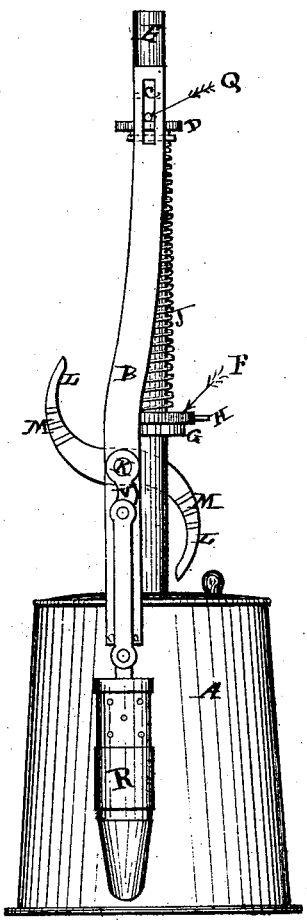
Figure 2 is a side elevation of the churn, showing the side of the revolving cams for operating the dasher.

Letter A represents the churn or barrel, having on its upper edges and at opposite sides two standards, B, secured thereto by any proper means.

In the upper ends of these standards are formed slots C, into which is arranged an adjustable cross-head, D, having a central opening in it for the upper end of the dash-rod E to work therein. This cross-head is held in the slots by adjusting pins, so that it may be adjusted higher or lower in the slots, at pleasure, in regulating the length of the stroke of the dasher.

At about midway between the top of the barrel and the cross-head is attached to the dash-rod a lifting-plate or collar, F, having a pinion-wheel, G, secured to its lower surface, and attached to the dash-rod by means of a set-screw or pin, H; and between the top of the lifting-plate and the lower side of the cross-head is also adjusted on the dash-rod a spiral spring, J.

To operate the dash-rod, a crank-shaft, K, is arranged transversely of the churn in suitable bearings in the standards B, having on it two cams, L, of any suitable length proportioned to the length of stroke of the dasher, with a toothed edge or face, M, so as to engage into the pinion-wheel G.

By this means, it will be readily seen that, while the cams acting on the plate F lift the dasher, the teeth M act on the pinion-wheel G, and thus lift the dashers and give them a rapid rotatory motion to agitate the milk during the upward motion of the dashers till relieved by the cam, when the spiral spring on the rod, reacting, gives a downward dashing motion through the milk, thereby, by one revolution of the crank-shaft, giving several distinct and positive agitations to the milk.

This dasher is formed of two disks, $N^1$ and $N^2$, adjusted on the lower end of the rod, at about four inches more or less apart, and having on the upper surface of the upper disk $N^2$ spirally-set butter-gatherers or paddles P.

The object of this construction of the dasher is, first, to cause a whirling motion in the milk as well as an upward agitating motion; and second, to act as a butter-gatherer on the surface of the milk. This is effected by shortening the length of the stroke of the dasher by means of the adjusting pins Q in the top of the dash-rod above the cross-head, which brings the upper disk $N^2$ near the surface of the milk in the churn, and, of course, the disk $N^1$ being below its surface, lifts the butter to the surface as the dasher works, while the upper disk collects and works it into a homogeneous mass.

It will be obvious, therefore, that the dashers will now act only on the surface of the milk, in consequence of shortening the throw of the cam and rotation of the pinion-wheel, and, as the buttery particles are all floating on the surface of the milk, the upper disk will act to patten as fast as the paddles P collect them together, while the lower disk lifts or throws them up to the surface, and thus perfects the operation of gathering the butter preparatory to its being removed from the churn.

When there is a small quantity of milk to be operated on, the lifting-plate is elevated on the dash-rod by the pin H, and thus, however small the quantity, the dashers will not be lifted too high to splash the milk too much for the convenience and cleanliness of the churning operation.

Letter R is an air-pump arranged vertically alongside of the barrel, and having its lower end inserted in the lower part of it, with its aperture inside of the barrel covered by a hinged valve, S, to cut off the back flow of the milk. In the pump is arranged a piston, T, the stem of which is attached to a crank-lever, V, on one end of the crank-shaft K, so that, as it is rotated by the handle W on its opposite end, it not only works the dashers, but also the air-pump to force a volume of air at each revolution of the shaft into the body of milk to oxidize it, as well as to agitate it, to cause the butter to separate more rapidly from it than if simply agitated by the dashers alone.

Having now described my invention, I will proceed to set forth what I claim:

1. The cams L, having on their sides or edges a rack, M, in combination with the lifting-plate F, having attached to its lower surface a pinion-wheel, G, substantially as described, for the purpose of simultaneously lifting and rotating the dasher, as set forth.

2. The combination of the spring J, dasher-rod E, dashers $N^1$ and $N^2$, having the paddle P attached, with the adjustable lifting-plate F, having a pinion-wheel, G, attached thereto, substantially as described.

3. In combination, the shaft K, cams L, with the rack M attached thereto, lifting-plate F, with wheel G attached thereto, and churn A, and air-pump R, all as one general combination, for the purposes set forth.

H. GARDINER.

Witnesses:
FRANKLIN BARRITT,
C. L. BARRITT.